United States Patent
Baek et al.

(10) Patent No.: US 10,264,246 B2
(45) Date of Patent: Apr. 16, 2019

(54) MULTI-VIEW IMAGE DISPLAY APPARATUS AND CONTROL METHOD THEREOF, CONTROLLER, AND MULTI-VIEW IMAGE GENERATION METHOD

(71) Applicant: SAMSUNG ELECTRONICS CO., LTD., Suwon-si (KR)

(72) Inventors: Seung-jin Baek, Seoul (KR); Seung-ran Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 14/886,611

(22) Filed: Oct. 19, 2015

(65) Prior Publication Data

US 2016/0345001 A1 Nov. 24, 2016

(30) Foreign Application Priority Data

May 21, 2015 (KR) ........................ 10-2015-0070914

(51) Int. Cl.
*H04N 13/00* (2018.01)
*H04N 13/351* (2018.01)
(Continued)

(52) U.S. Cl.
CPC ......... *H04N 13/351* (2018.05); *H04N 13/305* (2018.05); *H04N 13/31* (2018.05); *H04N 13/317* (2018.05); *H04N 13/111* (2018.05)

(58) Field of Classification Search
CPC ........... H04N 13/0447; H04N 13/0404; H04N 13/0415; H04N 13/0409; H04N 13/0011
See application file for complete search history.

(56) References Cited

U.S. PATENT DOCUMENTS 8,872,904 B1  10/2014  Hwang et al.
9,020,238 B2   4/2015  Ebata et al.
(Continued)

FOREIGN PATENT DOCUMENTS

JP   2008-042745 A    2/2008
JP   2012-227797 A   11/2012
(Continued)

OTHER PUBLICATIONS

International Search Report dated Aug. 8, 2016 issued by the International Searching Authority in counterpart International Application No. PCT/KR2016/005249 (PCT/ISA/210).
(Continued)

*Primary Examiner* — Zhihan Zhou
(74) *Attorney, Agent, or Firm* — Sughrue Mion, PLLC

(57) ABSTRACT

A multi-view image display apparatus including: an image receiver; a display including: a display panel; and a visual field divider disposed in front of a viewing surface of the display panel and configured to provide different viewpoints at which an image is viewed in a viewing zone; and a processor configured to: render a plurality of views of the image having different viewpoints based on a depth of the image, generate a multi-view image, and control the display panel to display the multi-view image. The processor is further configured to map a mixture pixel value to a target area of the multi-view image, the mixture pixel value being generated based on pixel values of a first viewpoint and a second viewpoint, and the target area being calculated based on a difference between an output pixel area of the display panel and a corresponding visible pixel area in the viewing zone.

20 Claims, 18 Drawing Sheets

(51) Int. Cl.
*H04N 13/305* (2018.01)
*H04N 13/31* (2018.01)
*H04N 13/317* (2018.01)
*H04N 13/111* (2018.01)

(56) References Cited

U.S. PATENT DOCUMENTS

| | | | | |
|---|---|---|---|---|
| 2011/0102423 A1* | 5/2011 | Nam | H04N 13/0404 | 345/419 |
| 2012/0249530 A1* | 10/2012 | Fukushima | G02B 27/2214 | 345/419 |
| 2012/0268452 A1* | 10/2012 | Ebata | H04N 13/0018 | 345/419 |
| 2012/0274630 A1* | 11/2012 | Lin | H04N 13/0409 | 345/419 |
| 2012/0293615 A1 | 11/2012 | Chen et al. | | |
| 2013/0135296 A1 | 5/2013 | Rha et al. | | |
| 2013/0195347 A1* | 8/2013 | Okada | G06T 15/00 | 382/154 |
| 2013/0293576 A1 | 11/2013 | Zomet | | |
| 2014/0111627 A1* | 4/2014 | Ishigami | H04N 13/0011 | 348/51 |
| 2014/0133022 A1* | 5/2014 | Kim | G02B 27/2214 | 359/463 |
| 2014/0340402 A1 | 11/2014 | Hamagishi et al. | | |
| 2014/0347452 A1 | 11/2014 | Smolic et al. | | |
| 2015/0062119 A1* | 3/2015 | Nakamura | H04N 13/0404 | 345/419 |
| 2015/0116312 A1 | 4/2015 | Baik | | |
| 2015/0195502 A1* | 7/2015 | Sumi | H04N 13/0468 | 348/43 |

FOREIGN PATENT DOCUMENTS

| | | |
|---|---|---|
| JP | 2013-172229 A | 9/2013 |
| KR | 10-0954281 B1 | 4/2010 |
| KR | 10-2014-0037023 A | 3/2014 |

OTHER PUBLICATIONS

Written Opinion dated Aug. 8, 2016 issued by the International Searching Authority in counterpart International Application No. PCT/KR2016/005249 (PCT/ISA/237).

* cited by examiner

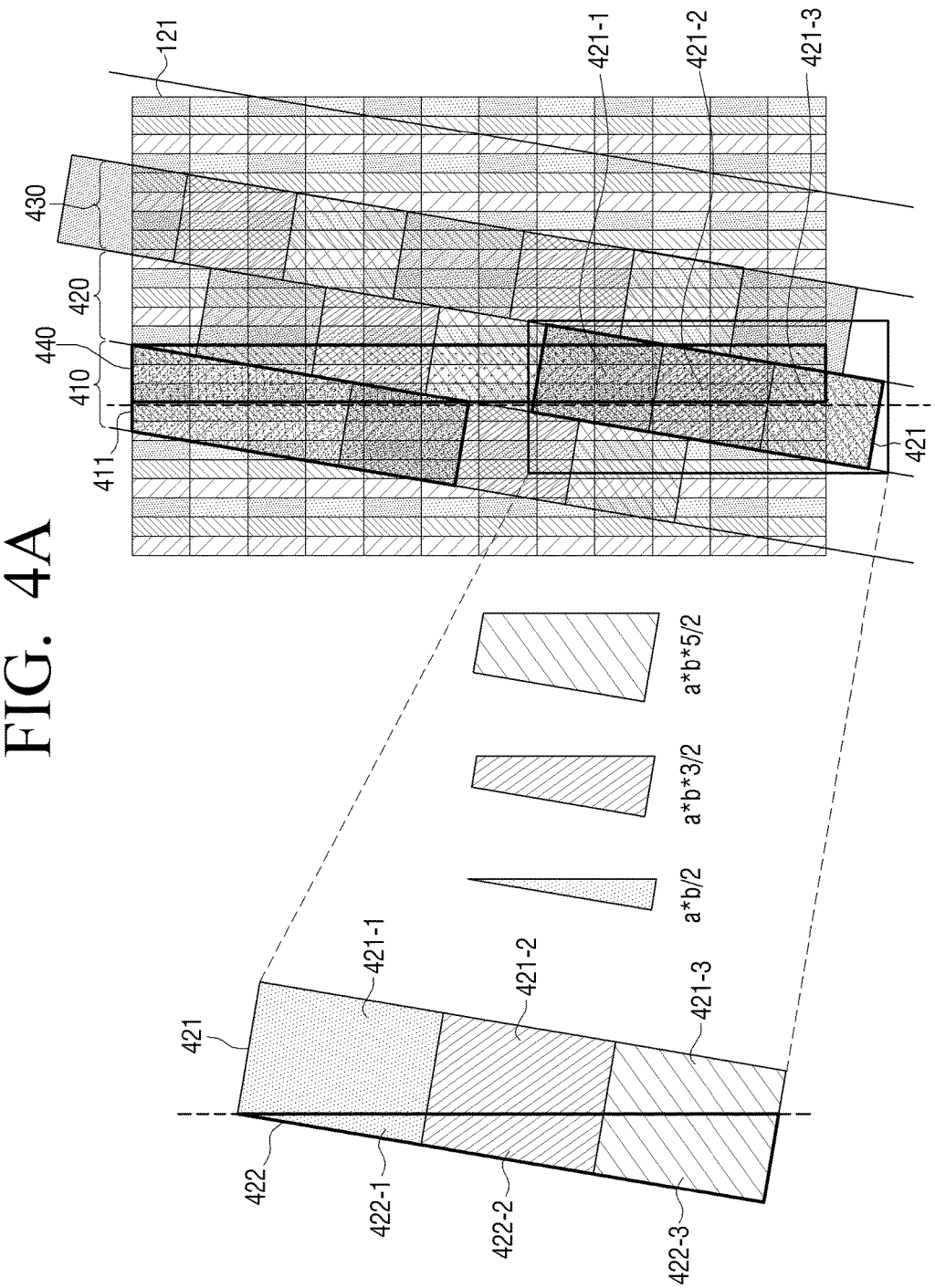

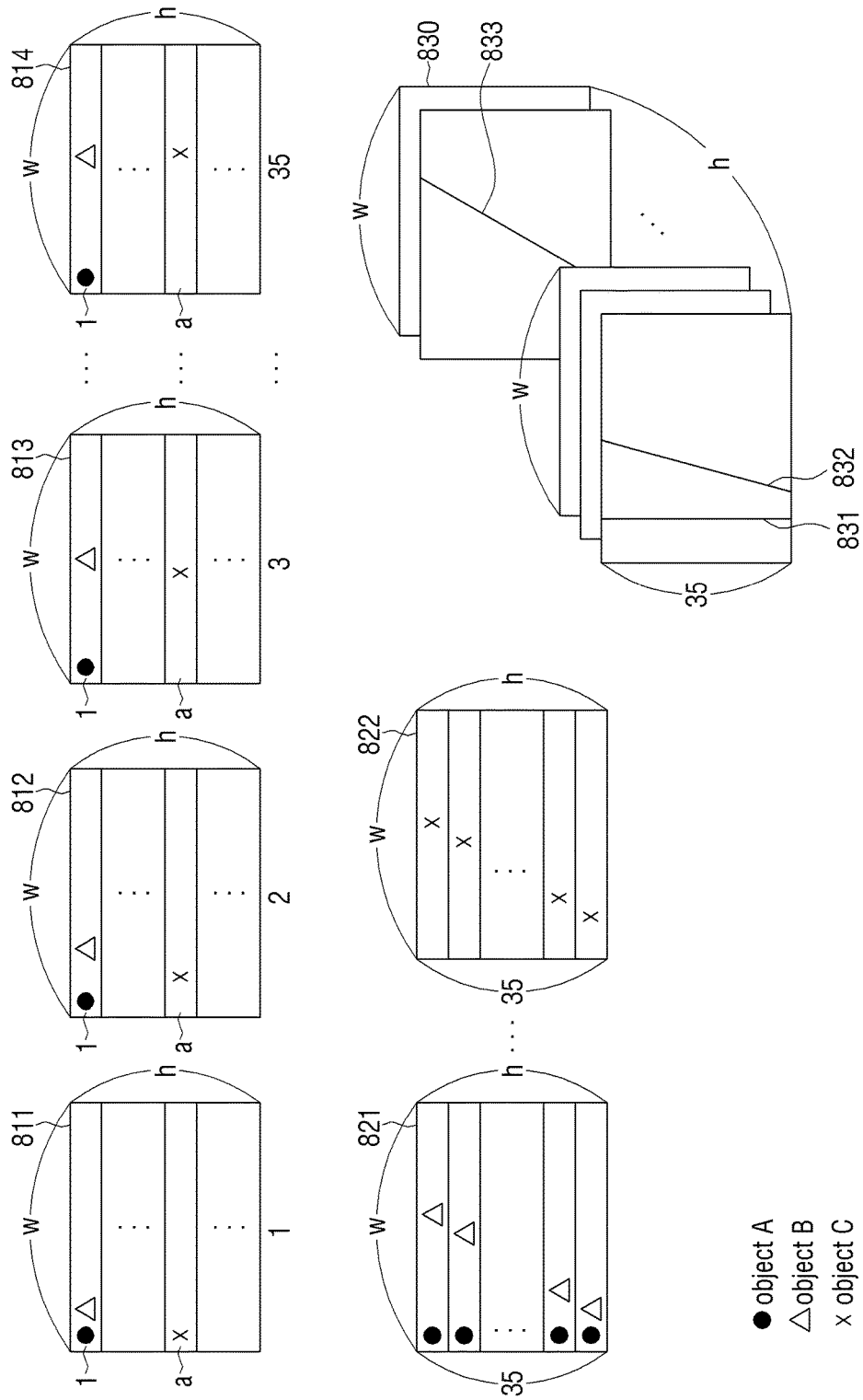

MULTI-VIEW IMAGE DISPLAY APPARATUS AND CONTROL METHOD THEREOF, CONTROLLER, AND MULTI-VIEW IMAGE GENERATION METHOD

CROSS-REFERENCE TO RELATED APPLICATION(S)

This application claims priority under 35 U.S.C. § 119 from Korean Patent Application No. 10-2015-0070914, filed on May 21, 2015, in the Korean Intellectual Property Office, the disclosure of which is incorporated herein by reference in its entirety.

BACKGROUND

1. Field

One or more aspects of one or more exemplary embodiments relate to a multi-view image display apparatus and a control method thereof, a controller, and a multi-view image generation method, and, more particularly, to providing an autostereoscopic multi-view image display apparatus and a control method thereof.

2. Description of the Related Art

Various types of electronic apparatuses have been developed and distributed. A display apparatus, such as a television (TV), etc., has continued to be developed.

Display apparatuses with a high-quality performance may display various kinds of content. In particular, stereoscopic display systems through which 3-dimensional (3D) contents may be viewed have been developed and distributed.

A stereoscopic display apparatus may be realized as various types of display apparatuses, such as a 3D TV, various types of monitors, a portable phone, a personal digital assistant (PDA), a personal computer (PC), a set-top PC, a tablet PC, an electronic frame, a kiosk PC, etc. Also, 3D display technology may be used in homes and various fields requiring 3D imaging, such as science, medicine, design, education, advertisement, computer games, etc.

A stereoscopic display system may be generally classified into an autostereoscopic system that enables 3D viewing without glasses and a stereoscopic system that enables viewing 3D with glasses.

The stereoscopic system may provide a satisfactory 3D effect, but a viewer must use glasses. Since the autostereoscopic system enables a 3D image to be viewed without glasses, a desire to develop the autostereoscopic system has continued.

An existing autostereoscopic system has a problem of image quality deterioration due to an optical structure thereof.

SUMMARY

One or more exemplary embodiments address the above problems and/or disadvantages and other disadvantages not described above. Also, exemplary embodiments are not required to overcome the disadvantages described above, and one or more exemplary embodiments may not overcome any of the problems described above.

According to an aspect of one or more exemplary embodiments, there is provided a multi-view image display apparatus that displays an output image by using pixel and depth information between times of an input image to provide a clear 3-dimensional (3D) image, and a control method thereof.

According to an aspect of one or more exemplary embodiments, there is provided a multi-view image display apparatus including: A multi-view image display apparatus including: an image receiver configured to receive an image; a display comprising: a display panel; and a visual field divider disposed in front of a viewing surface of the display panel and configured to provide different viewpoints at which the image is viewed in a viewing zone; and a processor configured to: render a plurality of views of the image having different viewpoints based on a depth of the image, generate, based on pixel values forming the plurality of views of the image, a multi-view image to be displayed on the display panel, and control the display panel to display the multi-view image, wherein the processor is further configured to generate the multi-view image by mapping a mixture pixel value to a target area of the multi-view image, wherein the mixture pixel value is generated based on a pixel value of a first viewpoint of the different viewpoints and a pixel value of a second viewpoint of the different viewpoints, and wherein the target area is calculated based on a difference between an output pixel area of the display panel and a corresponding visible pixel area provided in the viewing zone.

The visual field divider may be configured to provide at least one pixel area at a preset angle in the viewing zone, and the processor may be further configured to calculate the target area based on the preset angle and a pixel pitch of the visible pixel area.

The processor may be further configured to calculate the mixture pixel value by weighting the pixel value of the first viewpoint and the pixel value of the second viewpoint, and the weighting may be determined based on the pixel pitch of the visible pixel area and the preset angle.

The processor may be further configured to calculate the mixture pixel value by summing a first value acquired by multiplying the pixel value of the first viewpoint by a weight based on an area ratio of a first area of the visible pixel area corresponding to the output pixel area and a second value acquired by multiplying the pixel value of the second viewpoint by a weight based on an area ratio of a second area of the visible pixel area.

The processor may be further configured to: detect an edge area of the input image, and calculate the target area based on a difference between an output pixel area corresponding to the detected edge area and a visible pixel area corresponding to the detected edge area.

The processor may be further configured to: determine a position of a pixel value, the pixel value corresponding to the detected edge area, and the detected edge area being distributed in the plurality of views, and calculate the target area comprised in the determined position according to depth information of the input image.

The processor may be further configured to: determine a position of a pixel value, the pixel value corresponding to the detected edge area, and the detected edge area being distributed in an epipolar domain generated based on an epipolar image comprising equal pixel lines of the plurality of views, and apply filtering to the determined position according to the depth information to calculate the mixture pixel value.

The processor may be further configured to: perform weak filtering on a low-depth object in the image having a low depth, the depth of the low-depth object being based on the depth information, and perform strong filtering on a high-depth object in the image having a high depth, the depth of the high-depth object being based on the depth information.

The second viewpoint may include at least one of a previous viewpoint and a subsequent viewpoint of the first viewpoint.

The processor may be further configured to calculate the mixture pixel value for each one of red (R), green (G), and blue (B) sub pixels.

The second viewpoint may be an adjacent viewpoint to the first viewpoint.

The visual field divider may be disposed at a preset angle, and the pixel pitch of the visible pixel area may correspond to the preset angle at which the visual field divider is disposed.

According to another aspect of one or more exemplary embodiments, there is provided a method of controlling a multi-view image display apparatus including a display panel and a visual field divider disposed in front of a viewing surface of the display panel and configured to provide an optical view having different viewpoints in a viewing zone, the method including: rendering a plurality of views having different viewpoints based on a depth of an input image; generating, based on pixel values forming the plurality of views, a multi-view image to be displayed on the display panel; and displaying the multi-view image on the display panel, wherein the generating the multi-view image comprises mapping a mixture pixel value to a target area in the multi-view image, wherein the mixture pixel value is generated based on a pixel value of a first viewpoint of the different viewpoints and a pixel value of a second viewpoint of the different viewpoints, and wherein the target area is calculated based on a difference between an output pixel area of the display panel and a corresponding visible pixel area provided in the viewing zone.

The visual field divider may operate to provide at least one pixel area at a preset angle in the viewing zone, and the method may further include calculating the target area based on the preset angle and a pixel pitch of the visible pixel area.

The method may further include calculating the mixture pixel value by weighting the pixel value of the first viewpoint and the pixel value of the second viewpoint, and the weighting may be determined based on the pixel pitch of the visible pixel area and the preset angle.

The method may further include: acquiring a first value by multiplying the pixel value of the first viewpoint by a weight based on an area ratio of a first area of the visible pixel area corresponding to the output pixel area; acquiring a second value by multiplying the pixel value of the second viewpoint by a weight based on an area ratio of a second area of the visible pixel area; and calculating the mixture pixel value by summing the first value and the second value.

The method may further include: detecting an edge area of the input image; and calculating the target area based on a difference between the output pixel area corresponding to the detected edge area and a visible pixel area corresponding to the detected edge area.

The method may further include: determining a position of a pixel value, the pixel value corresponding to the detected edge area, and the detected edge area being distributed in the plurality of views; and calculating the target area comprised in the determined position according to depth information of the input image.

The method may further include: determining a position of a pixel value, the pixel value corresponding to the detected edge area, and the detected edge area being distributed in an epipolar domain generated based on an epipolar image comprising equal pixel lines of the plurality of views; and applying filtering according to the depth information input into the determined position to calculate the mixture pixel value that is to be mapped in the target area.

The calculating the mixture pixel value may include: performing weak filtering on a low-depth object in the image having a low depth, the depth of the low-depth object being based on the depth information, and performing strong filtering on a high-depth object in the image having a high depth, the depth of the high-depth object being based on the depth information.

The second viewpoint may include at least one of a previous viewpoint and a subsequent viewpoint of the first viewpoint.

The method may further include calculating the mixture pixel value of each one of red (R), green (G), and blue (B) sub pixels.

The second viewpoint may be an adjacent viewpoint to the first viewpoint.

The visual field divider may be disposed at a preset angle, and the pixel pitch of the visible pixel area may correspond to the preset angle at which the visual field divider is disposed.

According to another aspect of one or more exemplary embodiments, there is provided a controller for a display configured to provide a plurality of different viewpoints in a viewing zone, the controller including: a memory, having stored therein a program that, when executed by a processor, instructs the processor to: render a plurality of views of different viewpoints of an image based on a depth of the image, generate a mixture pixel value based on a pixel value of a first viewpoint of a first view of the plurality of views and a pixel value of a second viewpoint of a second view of the plurality of views, and generate, based on pixel values forming the plurality of views, a multi-view image to be displayed on the display by mapping the mixture pixel value to a target area of the multi-view image.

The program, when executed by the processor, may further instruct the processor to control the display to display the multi-view image comprising the mapped mixture pixel value.

According to another aspect of one or more exemplary embodiments, there is provided a method of generating a multi-view image for a display configured to provide a plurality of different viewpoints in a viewing zone, the method including: rendering a plurality of views having different viewpoints based on a depth of an input image; generating a mixture pixel value based on a pixel value of a first viewpoint of a first view of the plurality of views and a pixel value of a second viewpoint of a second view of the plurality of views; and generating, based on pixel values forming the plurality of views, a multi-view image to be displayed on the display, wherein the generating comprises mapping the mixture pixel value to a target area of the multi-view image.

The method may further include controlling the display to display the multi-view image comprising the mapped mixture pixel value

BRIEF DESCRIPTION OF THE DRAWINGS

The above and/or other aspects will be more apparent by describing certain exemplary embodiments with reference to the accompanying drawings, in which:

FIGS. 4A and 4B are views illustrating a pixel mapping method according to another exemplary embodiment;

FIGS. 8A through 8C are views illustrating a method of reflecting a depth to map pixels, according to another exemplary embodiment;

DETAILED DESCRIPTION OF THE EXEMPLARY EMBODIMENTS

Figure 1:
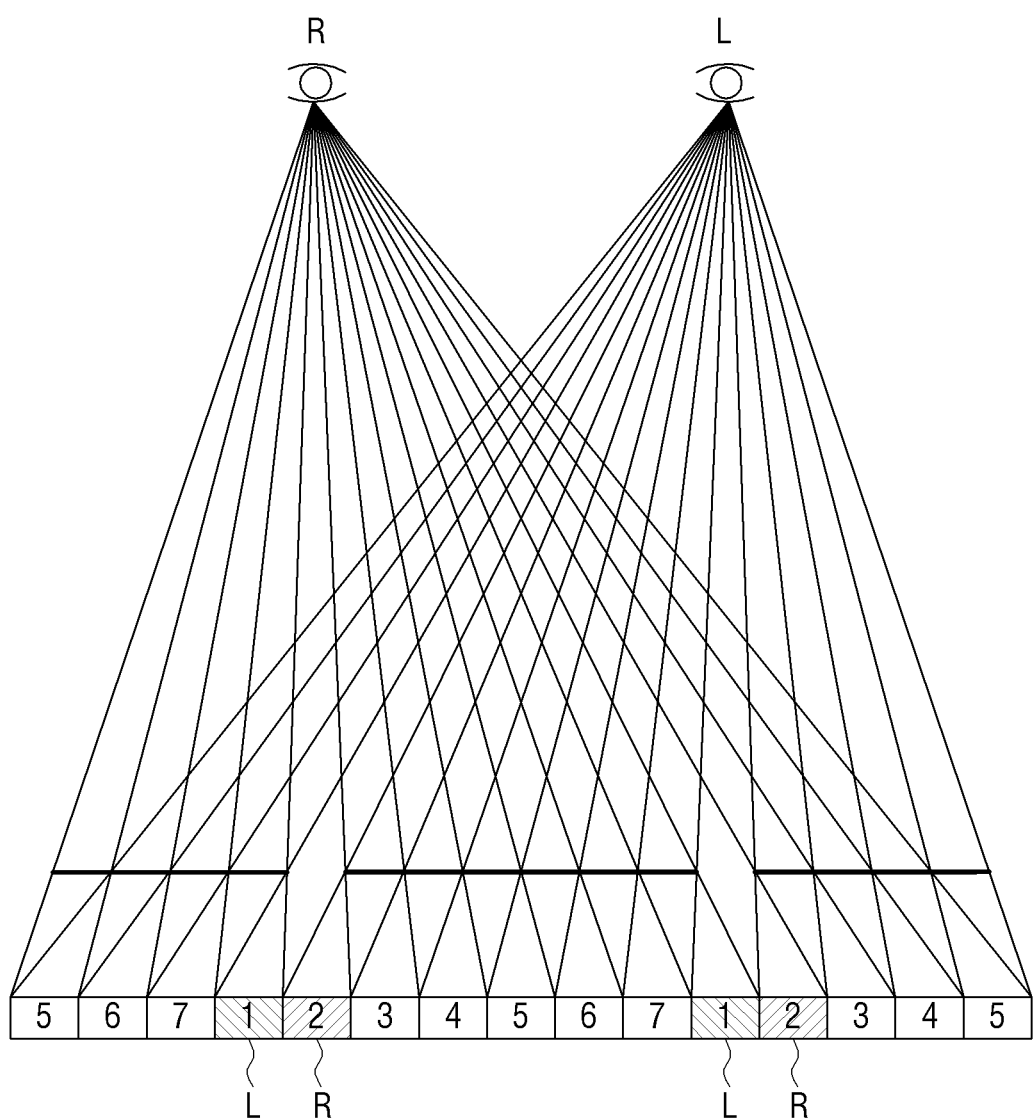
FIG. 1 is a view illustrating an operation of a multi-view image display apparatus according to an exemplary embodiment.

One or more exemplary embodiments may be diversely modified. Accordingly, one or more exemplary embodiments are illustrated in the drawings and are described in detail in the detailed description. However, it is to be understood that exemplary embodiments are not limited to the one or more exemplary embodiment described herein, but include all modifications, equivalents, and substitutions without departing from the scope and spirit of the present disclosure.

In the following description, the same drawing reference numerals are used for the same elements even in different drawings. The matters defined in the description, such as detailed construction and elements, are provided to assist in a comprehensive understanding of one or more exemplary embodiments. Thus, it is apparent that exemplary embodiments can be carried out without those specifically defined matters. Also, well-known functions or constructions are not described in detail since they would obscure the description with unnecessary detail.

Although the terms first, second, etc. may be used herein to describe various elements, these elements should not be limited by these terms. These terms are only used to distinguish one element from another element.

The terminology used herein is for the purpose of describing particular exemplary embodiments only and is not intended to be limiting. As used herein, the singular forms, such as "a," "an," and "the," are intended to include the plural forms as well, unless the context clearly indicates otherwise. It will be further understood that the terms "includes," "including," "comprises," and/or "comprising" specify the presence of stated features, integers, steps, operations, elements, and/or components, but do not preclude the presence or addition of one or more other features, integers, steps, operations, elements, components, and/or groups thereof.

In one or more exemplary embodiments, a "module" or a "unit" may perform at least one function or operation and may be embodied as hardware or software or as a combination of hardware and software. Also, a plurality of "modules" or a plurality of "units" may be integrated into at least one module to be embodied as at least one processor and/or memory. Certain modules may be embodied as particular hardware.

Also, when any part is connected to another part, this includes a direct connection and an indirect connection through another medium. Unless otherwise defined, when any part includes any element, it may mean that any part further include other elements without excluding other elements.

Hereinafter, one or more exemplary embodiments will be described in detail with reference to the accompanying drawings.

FIG. 1 is a view illustrating an operation of a multi-view image display apparatus according to an exemplary embodiment.

FIG. 1 illustrates an operation method of an apparatus that displays a multi-view image to provide a 3-dimensional (3D) image in an autostereoscopic method. The multi-view image may be generated based on a plurality of images that are acquired by capturing an object at different angles. In other words, a plurality of images captured from different views are refracted at different angles, and an image that is focused in a position keeping a preset distance (e.g., about 3 m) referred to as a viewing distance is provided. The position where an image is formed is referred to as a viewing zone (or an optical view). Therefore, if one eye of a viewer is positioned in a first viewing zone, and the other eye of the viewer is positioned in a second viewing zone, the viewer may feel a 3D effect.

FIG. 1 is a view illustrating a display operation of a multi-view image having a total of seven views. Referring to FIG. 1, an autostereoscopic 3D display apparatus may project light corresponding to a first view image of the seven views into a left eye and light corresponding to a second view image into a right eye. Therefore, the viewer may view images having different views with the left and right eyes and thus feel a 3D effect.

Figure 2A:
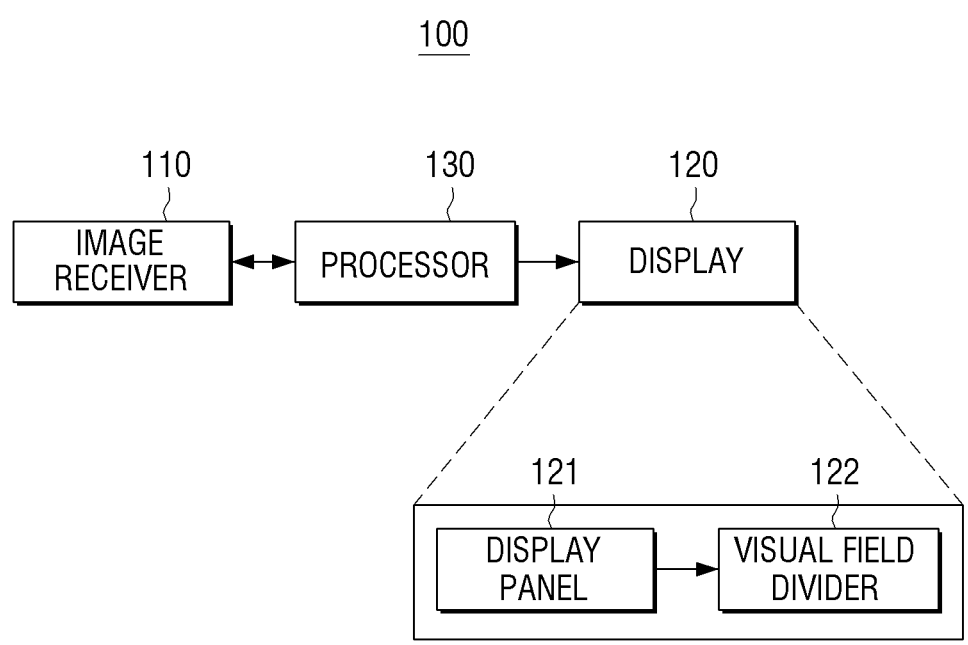
FIGS. 2A through 2C are views illustrating a structure of a multi-view image display apparatus according to an exemplary embodiment.
Figure 2B:
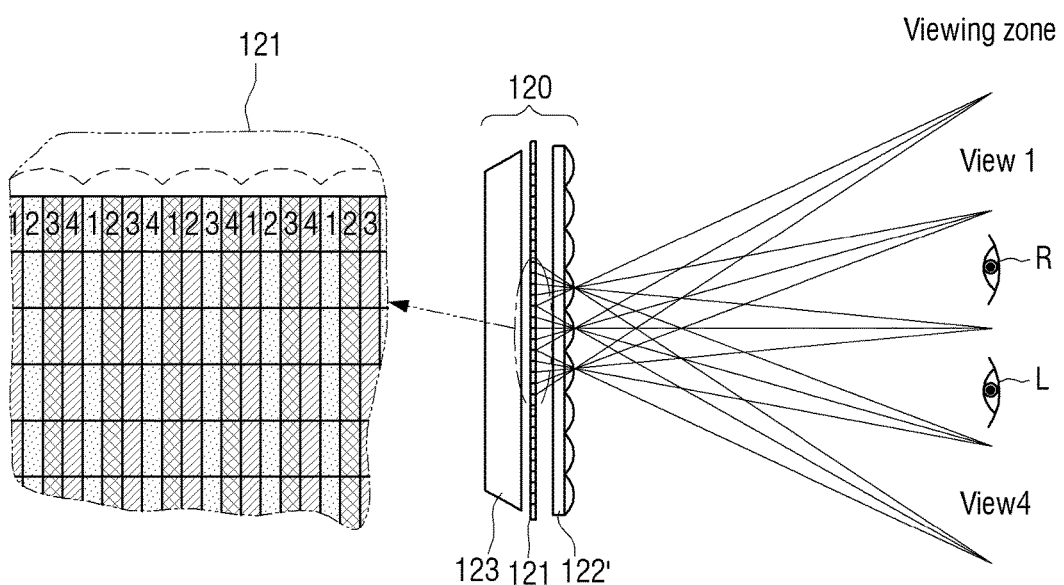
Figure 2C:
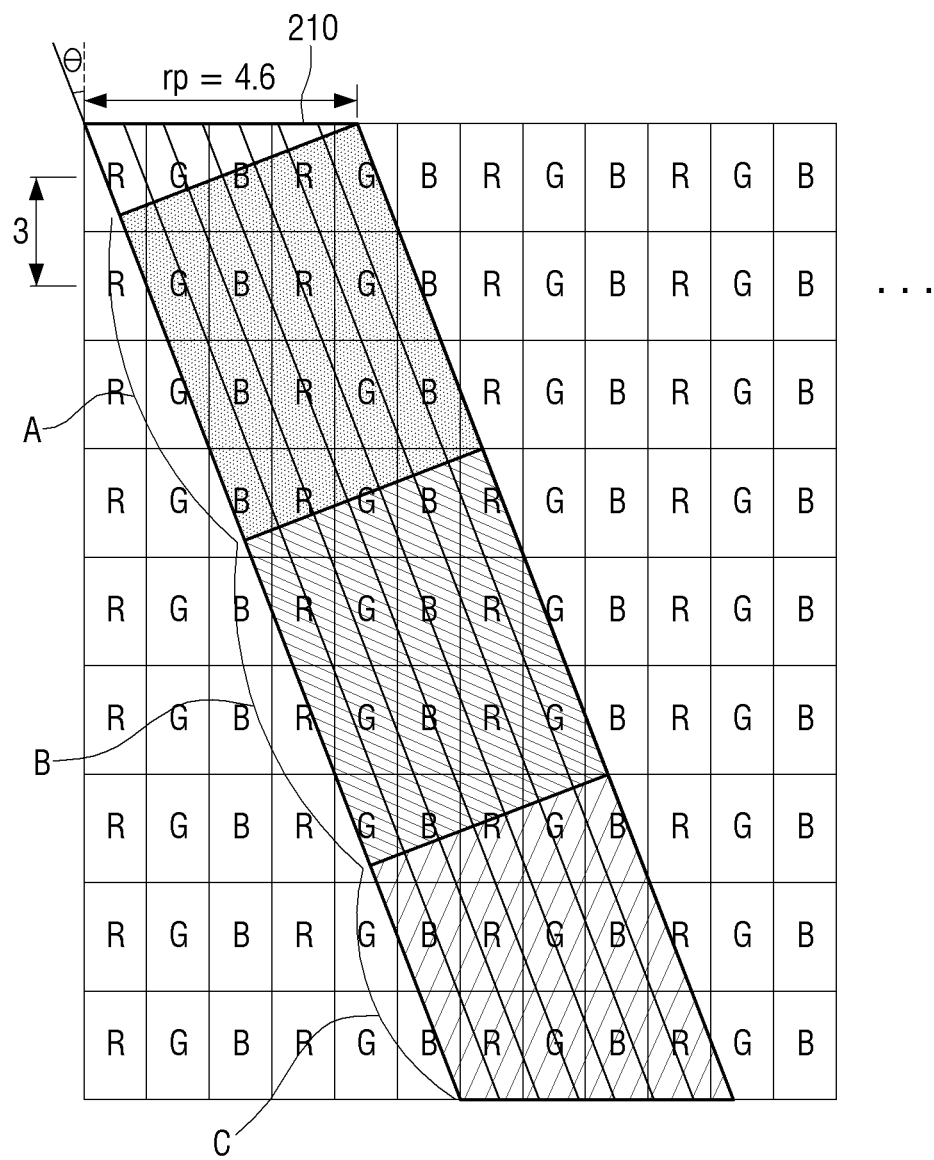

FIGS. 2A through 2C are views illustrating a structure of a multi-view image display apparatus 100 according to an exemplary embodiment.

FIG. 2A is a block diagram illustrating the structure of the multi-view image display apparatus 100, according to an exemplary embodiment.

Referring to FIG. 2A, the multi-view image display apparatus 100 includes an image receiver 110, e.g., an image input unit, a display 120, and a processor 130.

The multi-view image display apparatus 100 may be realized as various types of display apparatuses such as a TV, a monitor, a PC, a kiosk PC, a tablet PC, an electronic frame, a portable phone, etc.

The image receiver 110 receives an image. The image receiver 110 may receive the image from various types of external apparatuses, such as an external storage medium, a broadcasting station, a web server, etc. The received image is one of a single view image, a stereoscopic image, and a multi-view image. The single view image is an image captured by a general photographing apparatus, and the stereoscopic image is a 3D video image that is expressed with only left and right eye images, i.e., a 3D image captured by a stereoscopic photographing apparatus. In general, the stereoscopic photographing apparatus is a photographing apparatus including two lenses and used to capture a 3D image. The multi-view image refers to a 3D image that provides various views from several directions to the viewer through a geographical correction and a spatial synthesis of images captured by one or more photographing apparatuses.

The image receiver 110 may receive depth information of the image. In general, a depth of the image is a depth value assigned to each pixel of the image. As a non-limiting example, a depth using 8 bits may have a value between 0 and 255, i.e., a grayscale value. Alternatively, the depth value may be represented based on black and white, a black color (a low value) may indicate a position far away from a viewer, and a white color (a high value) may indicate a position close to the viewer.

The depth information is information indicating a depth of a 3D image, i.e., information corresponding to a binocular disparity between left and right eye images forming the 3D image. A degree of a 3D effect felt by a person varies with depth. In other words, if a depth is high, a binocular disparity between left and right eyes is high, and, thus, a 3D effect is felt relatively strongly. If the depth is low, the binocular disparity between the left and right eyes is low, and, thus, the 3D effect is felt relatively weakly. In general, depth information may be acquired through a passive method of acquiring depth information by using only 2-dimensional (2D) characteristics of an image such as stereo matching or the like and an active method using an apparatus such as a depth camera. The depth information may have a depth map form. A depth map refers to a table including depth information of each of a plurality of areas of an image. The areas may be divided according to pixel units, or may be defined as preset areas larger than pixel units. For example, the depth map may indicate that 127 or 128 of grayscale values is set to a reference value, i.e., 0 (or a focal plane), a value lower than 127 or 128 is expressed as "−" value, and a value higher than 127 or 128 is expressed as "+" value. A reference value of the focal plane may be arbitrarily selected between 0 and 255. Here, − value indicates sinking, and + value indicates protrusion.

The display 120 provides a plurality of optical views (or viewing zones). For this, the display 120 includes a display panel 121 and a visual field divider 122 for providing the plurality of optical views.

The display panel 121 includes a plurality of pixels each having a plurality of sub pixels. Here, the sub pixels may include red (R), green (G), and blue (B) sub pixels. In other words, pixels including R, G, and B sub pixels may be arranged in a plurality of rows and plurality of columns to form the display panel 121. The display panel 121 may be realized as various types of display panels such as a liquid crystal display panel (LCDP), a plasma display panel (PDP), an organic light-emitting diode (OLED), a vacuum fluorescent display (VFD), a field emission display (FED), an electro luminescence display (ELD), etc.

The processor 130 may render a plurality of views having different viewpoints.

In detail, the processor 130 may render the plurality of views having the different viewpoints based on depth information extracted when a 2-dimensional (2D) image is converted into a 3-dimensional (3D) image. Alternatively, if N views having different viewpoints and N pieces of depth information corresponding to the N views are input, the processor 130 may render a multi-view image based on at least one image and at least one piece of depth information among the input N views and the input N pieces of depth information. Also, if only the N views having the different viewpoints are input, the processor 130 may extract depth information from the N views and render the multi-view image based on the extracted depth information.

For example, the processor 130 may select a 3D image, i.e., one of left and right eye images, as a reference view (or a center view) to generate a leftmost view and a rightmost view that forms a basis of a multi-view image. In this case, the processor 130 may generate a leftmost view and a rightmost view based on corrected depth information corresponding to the one of left and right eye images selected as the reference view. If the leftmost view and the rightmost view are generated, the processor 130 may generate a plurality of interpolation views between a center view and the leftmost view and generate a plurality of interpolation views between the center view and the rightmost view to render a multi-view image. However, one or more exemplary embodiments are not limited thereto, and, thus, an extrapolation view may be generated according to an extrapolation technique. If a multi-view image is rendered based on a 2D image and depth information, the 2D image may be selected as a center view.

The above-described detailed operation of the processor 130 is merely an exemplary embodiment, and thus the processor 130 may render a plurality of views according to various methods besides the above-described operation.

The processor 130 may also control a depth of an input image based on depth information according to various criteria, and render a plurality of views based on the image having the controlled depth.

The display panel 121 displays an image frame under control of the processor 130. In detail, the display panel 121 may display a multi-view image frame where a plurality of views having different viewpoints are sequentially and repeatedly arranged.

If the display panel 121 is realized as an LCD panel, the display apparatus 100 may further include a backlight unit (BLU), e.g., a backlight, that provides backlight to the display panel 121, and a panel driver that drives pixels of the display panel 121 according to pixel values of pixels forming an image frame.

The visual field divider 122 may be disposed on a front surface (or a back surface) of the display panel 121 to provide different views according to viewing zones, i.e., optical views. In this case, the visual field divider 122 may be realized as a lenticular lens or a parallax barrier.

As a non-limiting example, the visual field divider 122 may be realized as a lenticular lens including a plurality of lens areas. Therefore, the lenticular lens may refract an image, which is displayed on the display panel 121, through the plurality of lens areas. Each of the lens areas may be formed in a size corresponding to at least one pixel and may differently diffuse light passing through each pixel according to viewing zones.

As another example, the visual field divider 122 may be realized as a parallax barrier. The parallax barrier is realized as a transparent slit array including a plurality of barrier areas. Therefore, the parallax barrier may block light through slits between the barrier areas to emit images having different viewpoints according to viewing zones.

FIG. 2B is a view illustrating the visual field divider 122 that is realized as a lenticular lens array, according to an exemplary embodiment.

Referring to FIG. 2B, the display 120 includes a display panel 121, a lenticular lens array 122', and a BLU 123.

As shown in FIG. 2B, the display panel 121 includes a plurality of pixels that are divided into a plurality of columns. Images having different viewpoints are arranged in respective areas. Referring to FIG. 2B, a plurality of images 1, 2, 3, and 4 having different viewpoints are sequentially and repeatedly arranged. In other words, groups numbered 1, 2, 3, and 4 are arranged in each pixel column. A graphic signal applied to the display panel 121 is arranged to enable a first pixel column to display a first image and enable a second pixel column to display a second image.

The BLU 123 provides light to the display panel 121. Due to the light provided from the BLU 123, images 1, 2, 3, and 4 formed on the display panel 121 are projected onto the lenticular lens array 122', and the lenticular lens array 122' diffuses light corresponding to the projected images 1, 2, 3, and 4 to transmit the diffused lights toward a viewer. In other words, the lenticular lens array 122' generates exit pupils in a position of the viewer, i.e., in a viewing distance. If a lenticular lens array is realized as shown, a thickness and a diameter of a lenticular lens may be designed to enable exit pupils generated by each column to be separated by an average binocular center distance of 65 mm or less. If a parallax barrier is utilized, a distance between slits, etc. may be designed to enable the exit pupils by each column to be separated from the average binocular center distance of 65 mm or less. Light from separated images form respective viewing zones. In other words, as shown in FIG. 2B, if first through fourth views are formed, left and right eyes of the viewer are respectively positioned in the second and third views, the viewer may view a 3D image.

The visual field divider 122 may slant at a preset angle to operate to improve an image quality. The processor 130 may divide a plurality of views based on the angle at which the visual field divider 122 slants and generate a multi-view image frame for combining and outputting the plurality of views. Therefore, the viewer may view an area slanting in a particular direction not an image displayed in a direction vertical or horizontal to sub pixels of the display panel 121. Therefore, the viewer may view a part of a sub pixel not one complete sub pixel as to at least some pixels.

For example, as shown in FIG. 2C, the viewer may view an area 210 that slants at a preset angle by the visual field divider 122. In particular, through an optical operation of the visual field divider 122, the viewer views a pixel area (hereinafter referred to as a visible pixel area) in the area 210 slanting as shown in FIG. 2C. In this case, sizes of pixels A, B, and C provided in the visible pixel area may be determined by a pitch of a lenticular lens.

According to an exemplary embodiment, the processor 130 generates a multi-view image to be displayed on the display panel 121, based on sub pixel values forming a plurality of views having different viewpoints.

In detail, the processor 130 may map a mixture pixel value, where a pixel value of a particular viewpoint of a plurality of views having different viewpoints is mixed with a pixel value of an adjacent viewpoint of the particular viewpoint, in at least one target pixel area to generate a multi-view image. In this case, the processor 130 may calculate a mixture pixel value of each one of R, G, and B sub pixels and map the calculated mixture pixel value in at least one target sub pixel area to generate a multi-view image. Here, the adjacent viewpoint of the particular viewpoint used for calculating the mixture pixel value may include previous and subsequent viewpoints of the particular viewpoint or may be a viewpoint that is separated by several or more viewpoints.

In other words, rather than a related method of mapping a sub pixel value of one view in a particular sub pixel area to generate a multi-view image that is to be output, the processor 130 may mix at least two sub pixel values corresponding to at least two views and map the mixed sub pixel value in a particular sub pixel area to generate a multi-view image that is to be output on the display panel 121.

For example, if a mixture pixel value that is to be an R sub pixel in position (1, 1) of a multi-view image to be display on the display panel 121 is calculated, the processor 130 may mix and calculate an R sub pixel value in position (1, 1) of a selected first viewpoint and an R sub pixel value in position (1, 1) of at least one adjacent viewpoint.

In particular, the processor 130 may display a multi-view image on the display panel 121. Here, a target area is calculated based on a difference between an output pixel area of the display panel 121 and a corresponding visible pixel area provided to the viewer through an optical view in a viewing zone of the viewer, and a mixture pixel value generated based on a pixel value of a particular viewpoint of a plurality of views and a pixel value of an adjacent viewpoint of the particular viewpoint is mapped in the target area to generate the multi-view image.

The processor 130 may detect at least one edge area of an input image and calculate a target area based on a difference between an output pixel area corresponding to the detected edge area and a visible pixel area where the edge area is provided through an optical view. In this case, the processor 130 may calculate the target area based on an angle at which the visual field divider 122 slants and a pixel pitch of the visible pixel area.

The processor 130 may apply a weight to a pixel value of a particular viewpoint and a pixel value of an adjacent viewpoint of the particular viewpoint to calculate the mixture pixel value. Here, the weight is determined based on the pixel pitch of the visible pixel area corresponding to the edge area of the input image and the angle at which the visual field divider 122 slants.

In detail, the processor 130 may sum a first value acquired by multiplying a pixel value of the output pixel area by a weight based on an area ratio of a first area of the visible pixel area corresponding to the edge area of the input image and corresponding to the output pixel area and a second value acquired by multiplying an adjacent pixel value of the output pixel area by a weight based on an area ratio of a second area of the visible pixel area causing jagging, to calculate a mixture pixel value that is to be mapped in the first area. This will be described later with reference to the attached drawings.

Further, the processor 130 may determine a position of a pixel value that corresponds to at least one edge area and is distributed on a plurality of views to calculate a target area included in the determined position, according to depth information of the input image.

The processor 130 may also determine a position of a pixel value that corresponds to at least one edge area and is distributed in an epipolar domain generated based on an epipolar image formed in the same pixel lines of a plurality of views and apply filtering according to depth information input into the determined position to calculate a mixture pixel value that is to be mapped in a target area.

Figure 3:
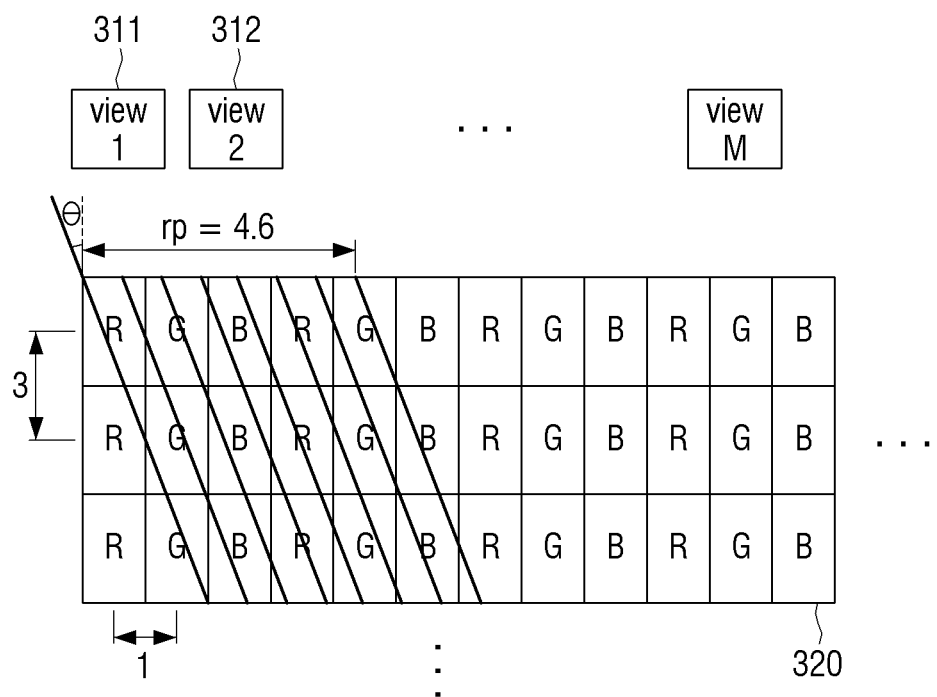
FIG. 3 is a view illustrating a pixel mapping method according to an exemplary embodiment.

FIG. 3 is a view illustrating a pixel mapping method according to an exemplary embodiment.

According to an exemplary embodiment, a number of a plurality of views and a pitch of a lenticular lens may be standards to generate a multi-view image, which is to be displayed, from a plurality of views having rendered different viewpoints.

For convenience of description, in FIG. 3, a number of a plurality of views 311, 312, etc., having different viewpoints may be M, and a pitch of a lenticular lens may cover 4.6 sub pixels. In this case, a view allocated to pixel position (i, j) may be calculated based on a method disclosed in non-patent Reference document "Cees van Derkel, "Image Preparation for 3D-LCD," Electronic Imaging '99," the disclosure of which is incorporated herein by reference in its entirety.

Figure 4B:
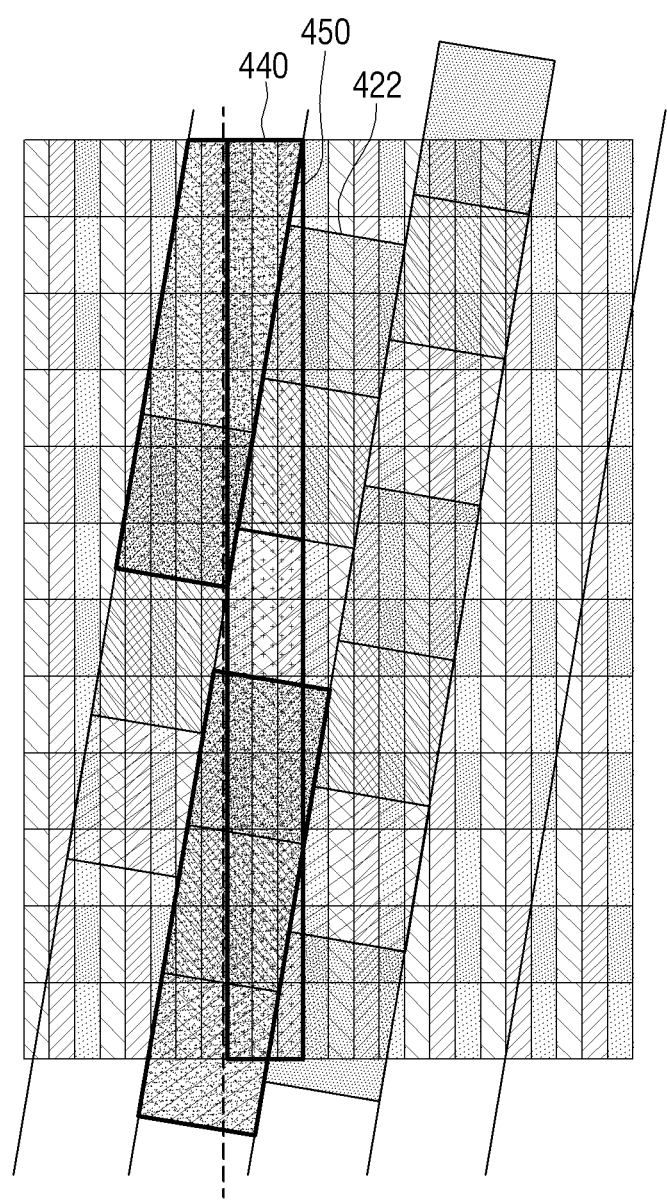

FIGS. 4A and 4B are views illustrating a pixel mapping method according to an exemplary embodiment.

As shown in FIG. 4A, a display panel 121 includes a plurality of pixels each including a plurality of sub pixels. Here, the sub pixels may include R, G, and B sub pixels. In other words, pixels each including R, G, and B sub pixels may be arranged in a plurality of rows and a plurality of columns to form the display panel 121.

Through an optical operation of a visual field divider provided on a front surface of the display panel 121, a viewer views visible pixel areas 410, 420, 430, etc., which slant at preset angles as shown in FIG. 4A. Sizes of pixels 421-1, 421-2, and 421-3 provided in a visible pixel area may be determined by a pitch of a lenticular lens.

If the display panel 121 displays a particular edge image in an output pixel area 440, the particular edge image is seen as the visible pixel areas 410 and 420 to the viewer. In other words, a pixel jagging phenomenon may cause deterioration in an image quality. A pixel mapping method for preventing the pixel jagging phenomenon according to an exemplary embodiment will now be described in detail with reference to a left side view of FIG. 4A.

The left side view of FIG. 4A enlarges a part of elements illustrated in a right side view of FIG. 4A, i.e., illustrates a part 421 of a visible pixel area as which the output pixel area 440 corresponding to the particular edge image is seen to the viewer.

An area 422 of the corresponding visible pixel area 421 divided by the output pixel areas 440 corresponding to the particular edge image corresponds to an area that causes a jagging phenomenon.

Therefore, a pixel value of an output pixel area 450 corresponding to the area 422 may be corrected as a mixture pixel value to reduce the jagging phenomenon. For example, if an edge image is white, and an adjacent background area is black, the output pixel area 450 corresponding to the visible pixel area 422, which is seen in white to eyes of the viewer to cause jagging, may be mapped in an original pixel value, i.e., a pixel value adjacent to white, i.e., a mixture pixel value of black, to be smoothly processed to reduce the jagging phenomenon.

In this case, in order to calculate the mixture pixel value, a weight, which is determined based on a pixel pitch of a visible pixel area and a slanting angle, may be applied to a pixel value of a particular viewpoint mapped in an output pixel area and a pixel value of an adjacent viewpoint mapped in an adjacent pixel area. In general, in a multi-view image, a pixel value of an adjacent viewpoint of a particular viewpoint may be mapped in an adjacent pixel of an output pixel on which a pixel value of the particular viewpoint is mapped. Therefore, the pixel value of the particular viewpoint and the pixel value of the adjacent viewpoint may be mixed to calculate a mixture pixel value. Here, the adjacent viewpoint may refer to a viewpoint separated by several viewpoints, in addition to previous and subsequent viewpoints.

In detail, a value acquired by multiplying a pixel value of the output pixel area (e.g., white pixel value 255 corresponding to an edge image) by a weight on an area ratio of first pixel areas 421-1, 421-2, and 421-3 corresponding to the output pixel area and a value acquired by multiplying an adjacent pixel value (e.g., black pixel value 0 corresponding to a background image) by a weight on an area ratio of the second area 422 of a visible pixel area causing jagging may be summed to calculate a mixture pixel value that is to be mapped in the output pixel area 450 seen as the second area 422 to the viewer.

For example, if a pixel pitch is 4.688p, and a slanting angle is 80.50°, an area of a first sub pixel 422-1 causing jagging in a first visible pixel area 421-1 may be calculated as a*b/2, an area of a second sub pixel 422-2 may be calculated as a*b*3/2, and an area of a third sub pixel 422-3 may be calculated as a*b*5/2. In this case, a value of a may be calculated as a=1/cos(80.50° and a value of b may be calculated as b=a/tan(80.50° according to a trigonometrical function law.

If an area ratio of the first sub pixel 422-1 is r in the visible pixel area 421-1, a mixture pixel value may be calculated as pixel value (e.g., black pixel value 0 corresponding to a background image) of adjacent pixel area*r+pixel value (e.g., white pixel value 255 corresponding to an edge image) of output pixel area*(1−r). The mixture pixel value calculated as described above may be mapped in an output pixel area corresponding to the first visible pixel area 421-1. According to this method, a mixture pixel value that is based on the second and third sub areas 422-2 and 422-3 may be calculated and may be mapped in output pixel areas corresponding to the second and third visible pixel areas 421-2 and 421-3. A pixel mapping method as described above may be performed on each sub pixel.

Also, as shown in FIG. 4B, a pixel mapping method similar to the pixel mapping method of FIG. 4A may be performed on an output pixel area corresponding to visible pixel areas 450 causing a jagging phenomenon. In brief, a mixture pixel value that is calculated as shown in FIG. 4B may be mapped in a right adjacent pixel area of an output pixel area corresponding to the visible pixel area 450, i.e., an output pixel area that displays an edge image to reduce a jagging phenomenon occurring in an edge area.

However, according to another exemplary embodiment, a mixture pixel value may be calculated based on a pixel value of an adjacent viewpoint and a pixel value of an adjacent viewpoint of the adjacent viewpoint. For example, if an adjacent viewpoint, which is determined based on the pixel mapping method described with reference to FIG. 4A and is to be mapped in a first R sub pixel, is a first viewpoint, a pixel value, where a pixel value of the first viewpoint and pixel values of second and seventh viewpoints that are adjacent viewpoints are mixed, may be mapped in the first R sub pixel of an output image. In other words, where an R sub pixel value of the first viewpoint, an R sub pixel value of the second viewpoint, and an R sub pixel value of the seventh viewpoint are mixed according to a preset weight to calculate a pixel value, the pixel value may be mapped in the first R sub pixel.

According to another exemplary embodiment, a mixture pixel value may be calculated based on a pixel value of an adjacent viewpoint and a pixel value of an adjacent pixel area including adjacent pixel values of an adjacent pixel value. For example, if an adjacent viewpoint, which is determined according to the pixel mapping method described with reference to FIG. 4A and is to be mapped in the first R sub pixel, is a first viewpoint, a mixture pixel value may be calculated based on a pixel area including a particular sub pixel value of the first viewpoint, the corresponding sub pixel, an adjacent sub pixel, and a pixel area corresponding to the second and seventh viewpoints that are adjacent viewpoints. In other words, a pixel value, wherein R pixel values of a particular R sub pixel area of a first viewpoint, a particular R sub pixel area of a second viewpoint, and a particular R sub pixel area of a seventh viewpoint are mixed according to a preset weight, is mapped in a first R sub pixel.

Figure 5A:
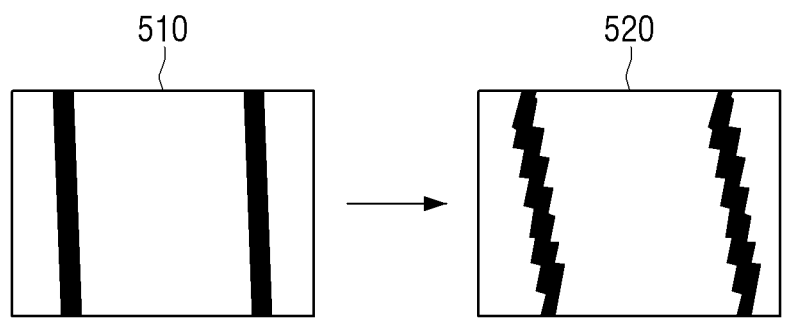
FIGS. 5A and 5B are views illustrating an effect of relieving a deterioration in an image quality, according to an exemplary embodiment.
Figure 5B:
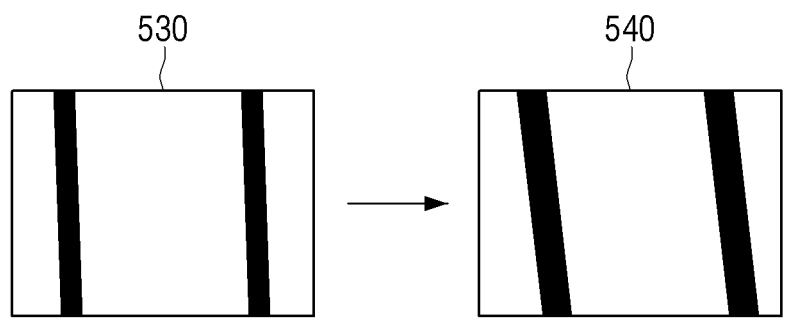

FIGS. 5A and 5B are views illustrating an effect of relieving deterioration in an image quality, according to an exemplary embodiment.

FIG. 5A is a view illustrating an image quality deterioration phenomenon to which one or more exemplary embodiments are not applied.

A left side view 510 of FIG. 5A illustrates an edge image that is actually displayed on a display panel, and a right side view 530 illustrates a visible image as which an edge image is seen to a viewer through an optical structure of a 3D display apparatus.

As shown in FIG. 5A, an image quality is deteriorated by a jagging phenomenon that occurs in an edge area through an optical structure of a 3D display apparatus.

FIG. 5B is a view illustrating an effect of relieving a deterioration in an image quality according to an exemplary embodiment.

A left side view 530 of FIG. 5B illustrates an edge image that is actually output on a display panel. A right side view 540 illustrates a visible image as which an edge image actually output on a display panel is seen to the viewer according to one or more exemplary embodiments. According to one or more exemplary embodiments, a jagging phenomenon may be relieved.

Figure 6:
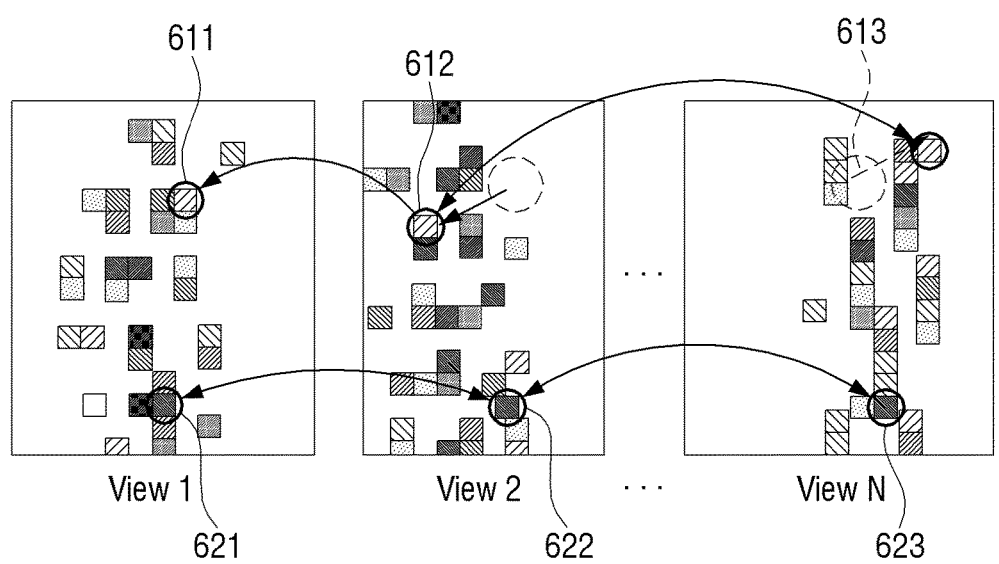
FIGS. 6 and 7 are views illustrating pixel movement between views according to another exemplary embodiment.
Figure 7:
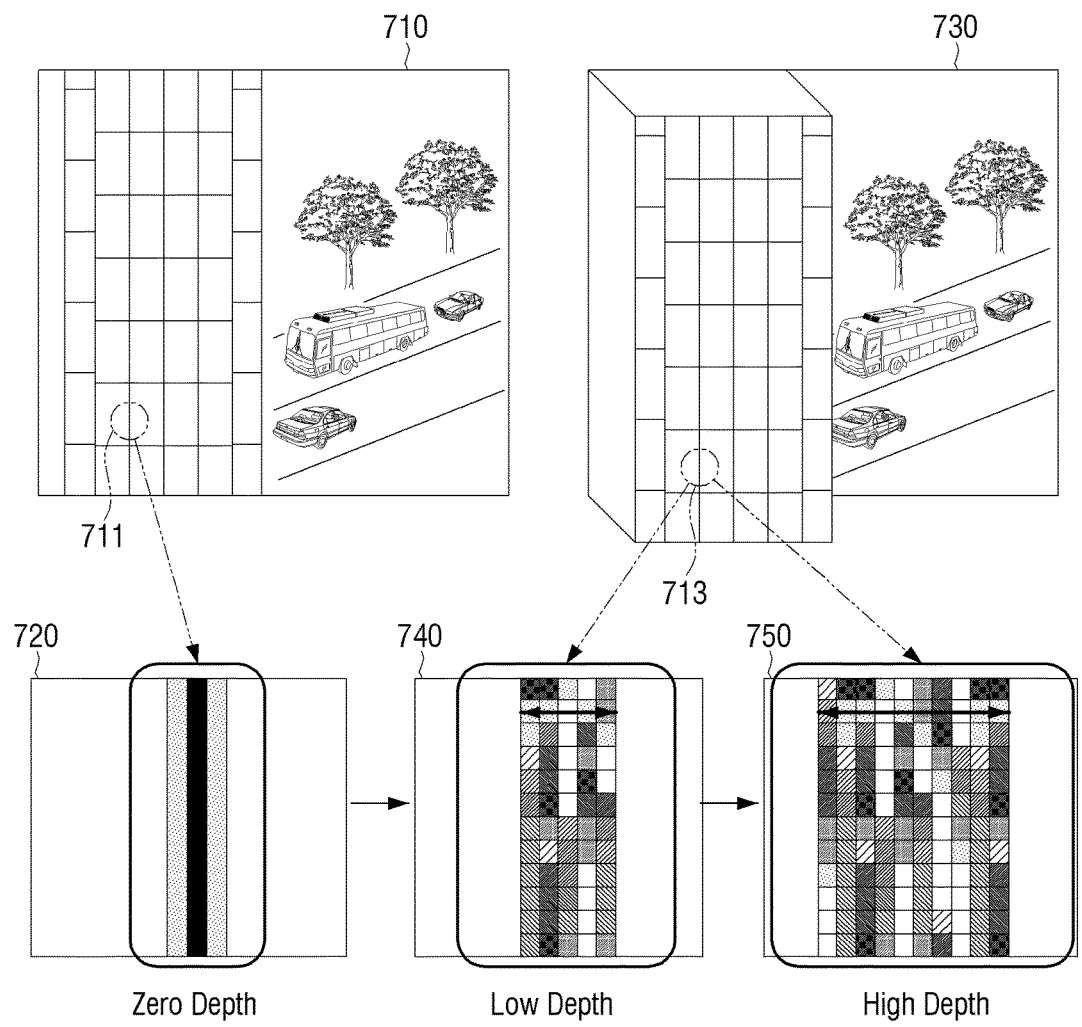

FIGS. 6 and 7 are views illustrating pixel movement between views according to another exemplary embodiment.

FIG. 6 illustrates an amount of pixel movement between views according to depths.

As shown in FIG. 6, a movement amount of positions of a pixel that has a high depth is larger than a movement amount of positions of a pixel that has a low depth.

For example, as shown in FIG. 6, a pixel having a high depth moves between positions 611, 612, and 613 on first, second, and $N^{th}$ views, but a pixel having a low depth moves between positions 621, 622, and 623 on the first, second, and Nth views.

A pixel having no depth is in the same position on respective views.

As shown in FIG. 7, an edge image 711 is included in an image 710 including a front view (e.g., a building) and a background (e.g., a roadway) having the same depth. The edge image 711 is seen by a viewer in a form 720 equal to an image output on a display panel.

However, if a front view, i.e., a building image, has a preset depth, a movement amount of a pixel corresponding to an edge image 713 greatly increases among a plurality of views. Therefore, the corresponding pixel is seen as a blur by the viewer who sees a multi-view image generated based on a plurality of views, and degrees of pixels 740 and 750 seen separated from each other increase with an increase in a depth value.

As shown in FIGS. 6 and 7, if a depth is high, a movement amount of a pixel is high between views, and, thus, an image quality is deteriorated. Therefore, image-quality processing reflecting a depth may be performed in an epipolar domain.

Figure 8A:
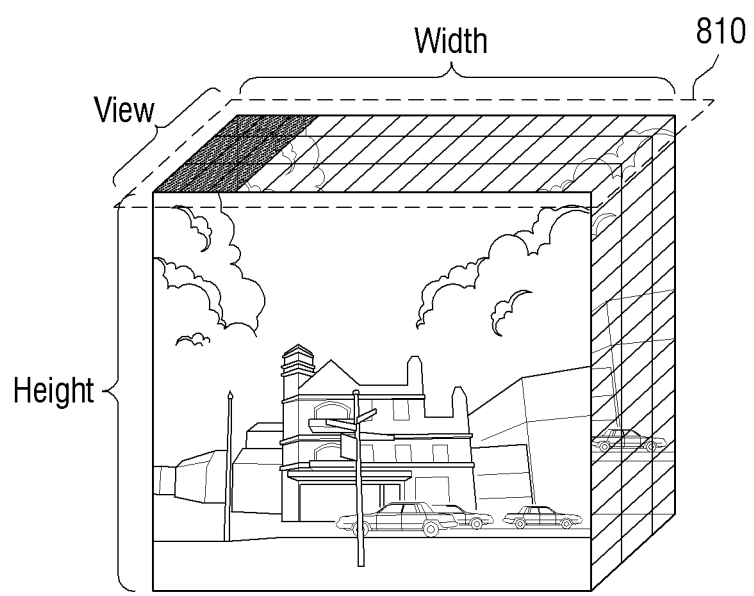
Figure 8C:
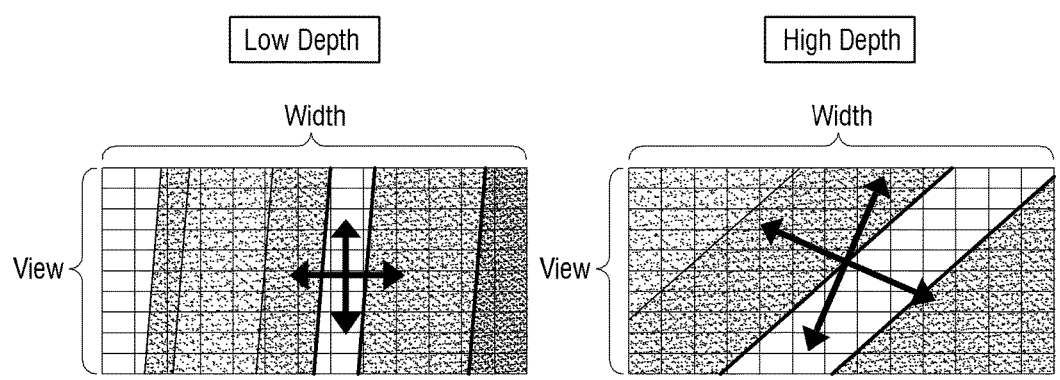

FIGS. 8A through 8C are views illustrating a method of reflecting a depth to map a pixel, according to another exemplary embodiment.

As shown in FIG. 8A, in an epipolar domain 810, a plurality of views having rendered from different viewpoints may be arranged on a Y axis (or view axis), and widths and heights of the views form an X-Z axis (i.e., width-height axis). In other words, an image where the same pixel lines of a plurality of views are combined may form an X-Y axis, i.e., width-height axis. For example, the same pixel lines of a plurality of views may form Y axis, i.e., view axis.

For example, as shown in FIG. 8B, 35 multi-view images having heights h and widths w may be rendered.

In this case, pixel lines of 35 multi-view images 811 through 814 may be combined to form epipolar images respectively corresponding to the pixel lines. In detail, first pixel lines may be combined to form a first image 821, $a^{th}$ pixel lines may be combined to form an $a^{th}$ image 822, and h images corresponding to the number of pixel lines generated as described may be sequentially combined to form an epipolar image.

In this case, a line having a preset shape may appear in an image corresponding to each pixel line according to a depth size of an object, i.e., a depth size of a pixel area. For example, object A "●" has a depth of 0 and thus exists in the same position in 35 multi-view images. However, object B "Δ" has a depth of preset size, and thus a position thereof is gradually changed in the 35 multi-view images. This position change appears in a preset line form. Referring to FIG. 8B, a line corresponding to the object A "●" having the depth value of 0 appears in a vertical form, and lines corresponding to the object B "Δ" and object C "x" having preset depth sizes appear in oblique line forms.

Therefore, if a view side of an epipolar domain of FIG. 8A has a low depth as shown in FIG. 8C, a line appears in a straight line that slightly slants, as shown on a left side view of FIG. 8C. If the view side of the epipolar domain has a high depth, the line appears in a straight line that greatly slants, as shown on a right side of FIG. 8C.

A degree of considering information between viewpoints may be changed according to a pixel pitch of a visible pixel area of a display panel, a slanting angle, and a depth to perform pixel mapping.

Figure 9:
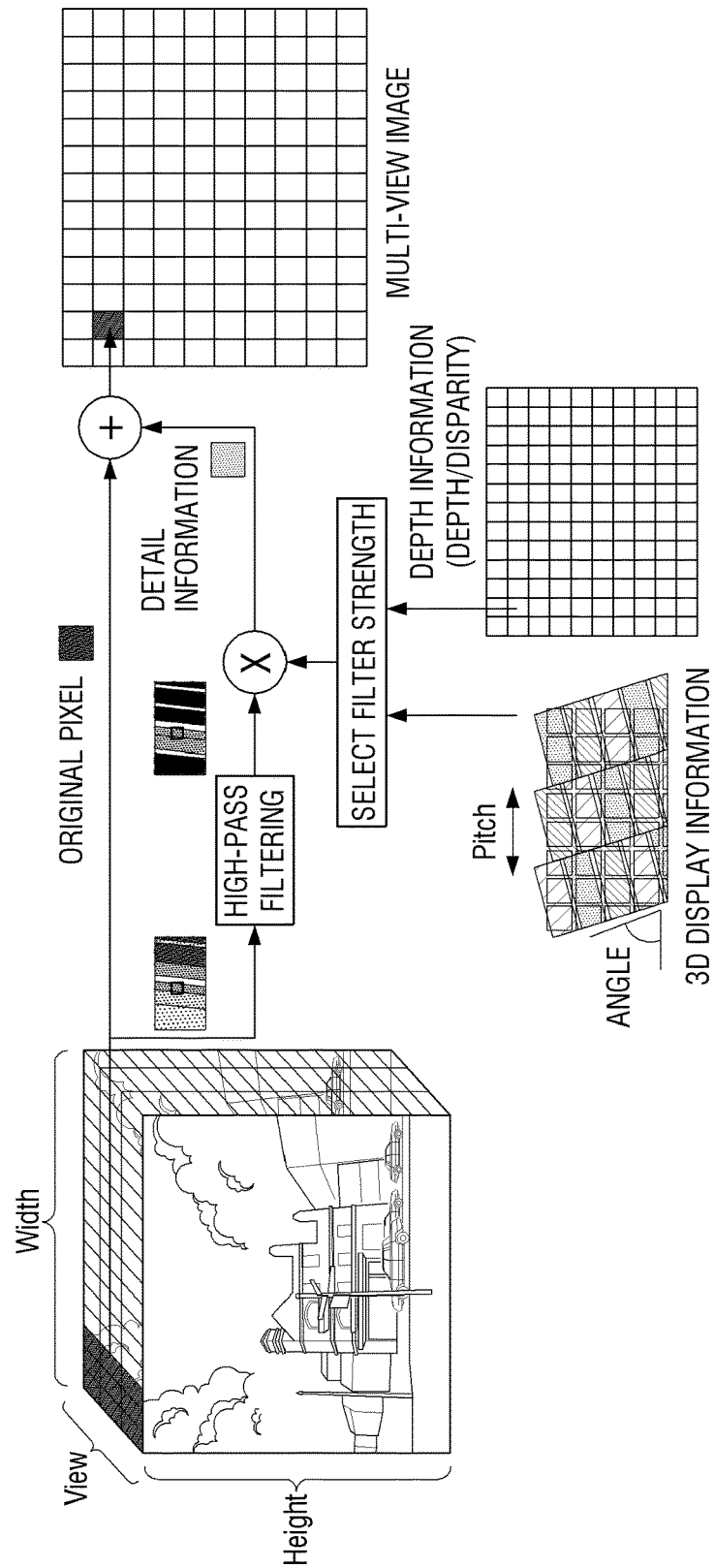
FIG. 9 is a view illustrating a method of filtering a pixel value in an epipolar domain, according to an exemplary embodiment.

FIG. 9 is a view illustrating a method of filtering a pixel value in an epipolar domain according to another exemplary embodiment.

As shown in FIG. 9, an image may be formed in an epipolar domain, and then a ratio, to which a result value of a high-pass filter (HPF) is added, may be determined in consideration of a pixel pitch of a visible pixel area of a display panel, a slanting angle, and a depth to determine a sub pixel value of an output image through unsharp masking.

In detail, the display panel may select a strength of the HPF according to a depth, and a pixel pitch and a slanting angle of a visible pixel area.

Figure 10:
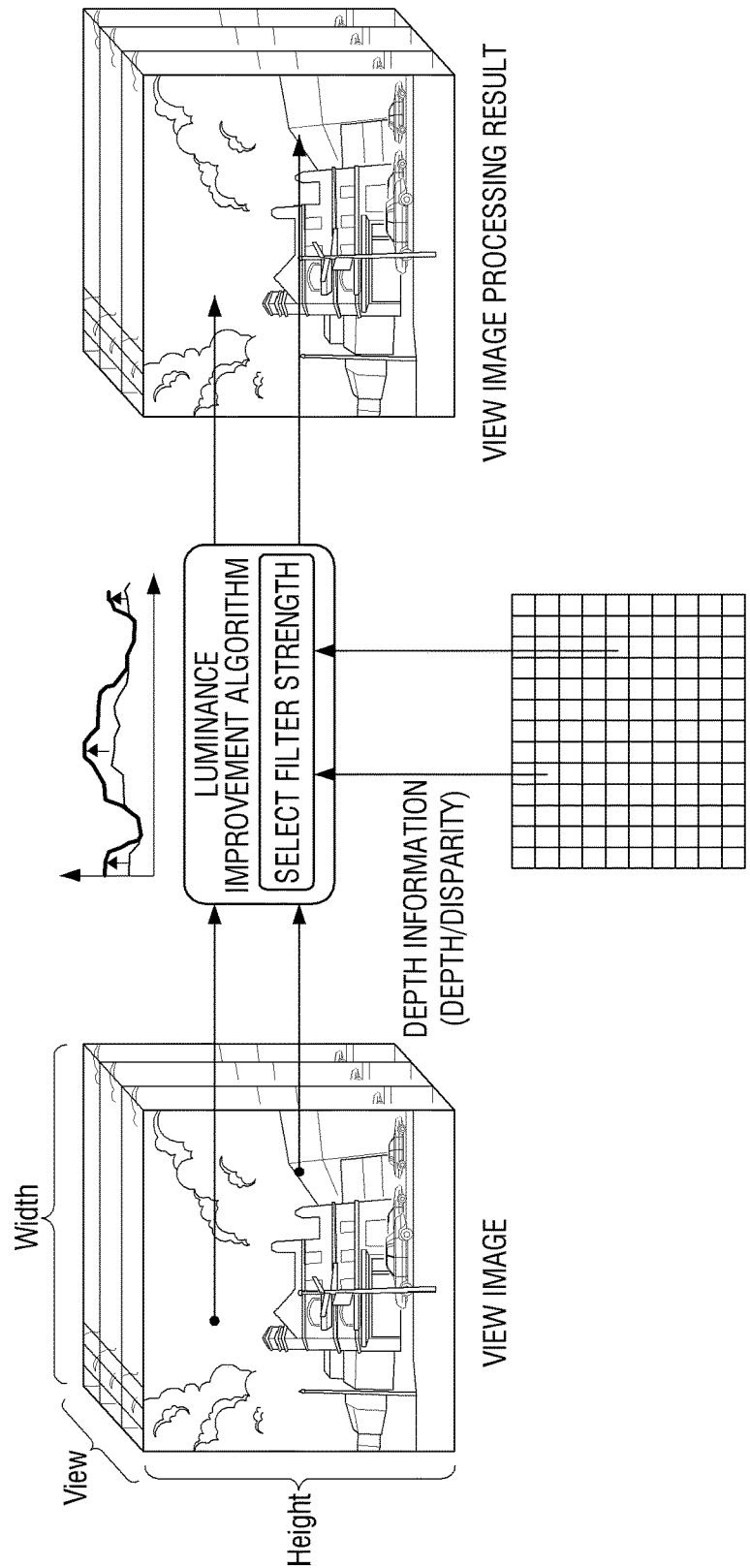
FIGS. 10 and 11 are views illustrating a method of filtering a pixel value in an epipolar domain, according to another exemplary embodiment.
Figure 11:
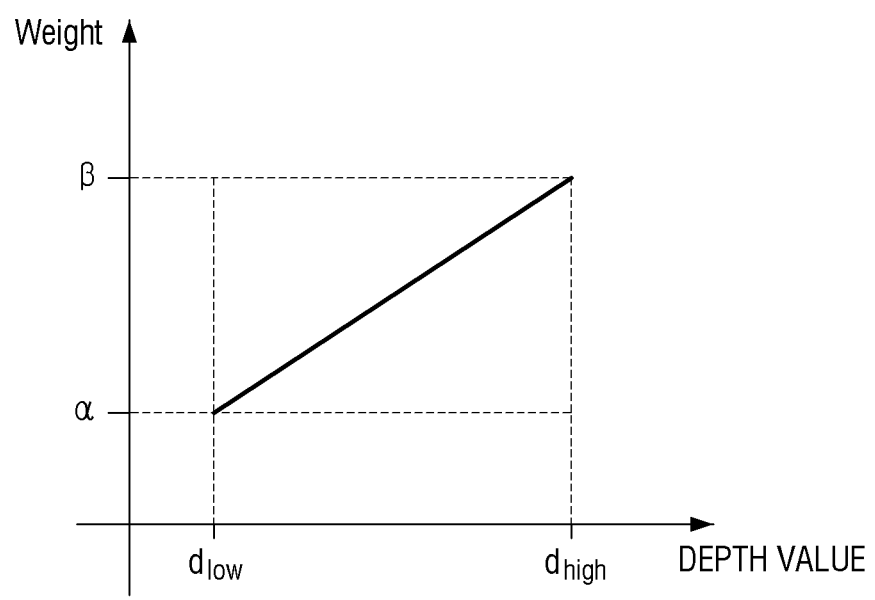

FIGS. 10 and 11 are views illustrating a method of filtering a pixel value in an epipolar domain, according to another exemplary embodiment.

As shown in FIG. 10, an image may be formed in an epipolar domain, and then a filter strength may be selected to apply a luminance improvement algorithm.

In detail, as shown in FIG. 11, weak filtering may be performed on a background image having a low depth, and strong filtering may be performed on a background image having a high depth.

Figure 12:
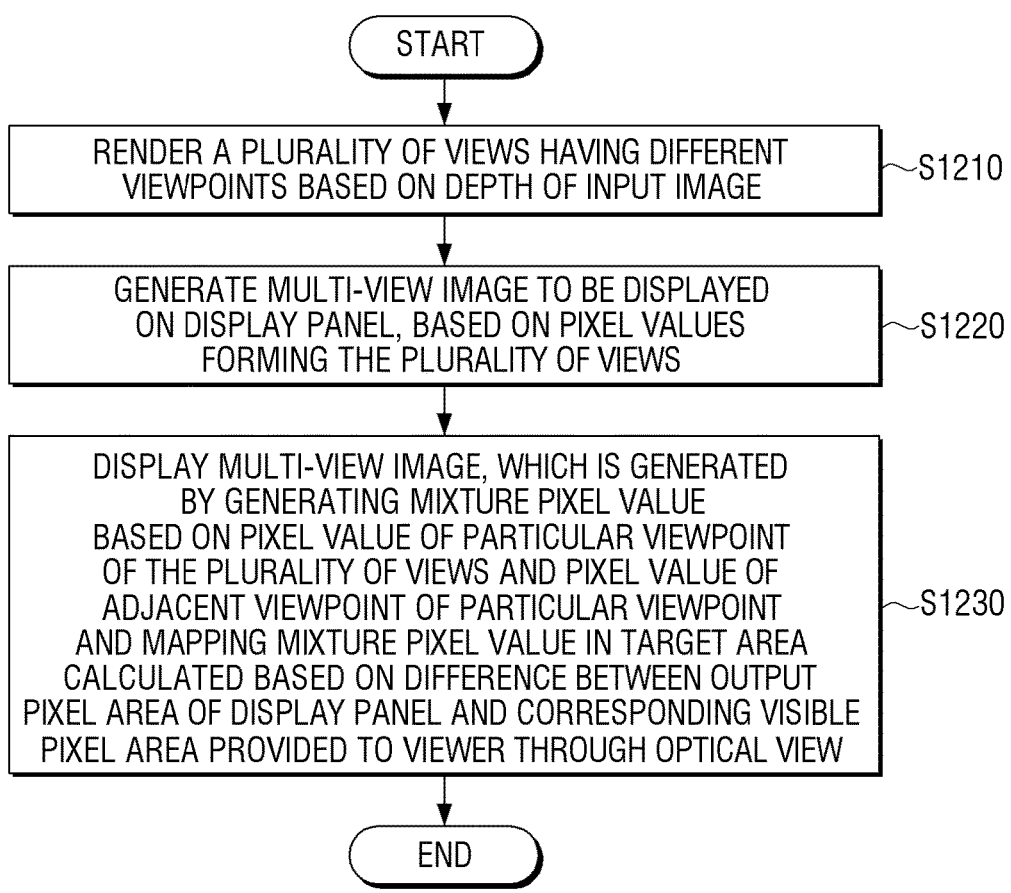
FIG. 12 is a flowchart illustrating a method of controlling a multi-view image display apparatus according to an exemplary embodiment.

FIG. 12 is a flowchart illustrating a method of controlling a multi-view image display apparatus, according to an exemplary embodiment.

According to a method of controlling a multi-view image display apparatus including a display panel and a visual field divider disposed on a front surface of the display panel to provide optical views having different viewpoints in a viewing zone of a viewer, a plurality of views having different viewpoints are rendered based on a depth of an input image in operation S1210.

In operation S1220, a multi-view image to be displayed on the display panel is generated based on a pixel value forming a plurality of views.

In operation S1230, the multi-view image is displayed on the display panel. Here, a mixture pixel value is generated based on a pixel value of a particular viewpoint of a plurality of views and a pixel value of an adjacent viewpoint of the particular viewpoint and is mapped in a target area to generate the multi-view image. The target area is calculated based on a difference between an output pixel area of the display panel and a corresponding visible pixel area provided to the viewer through an optical view.

Here, the visual field divider operates to provide at least one pixel area slanting at a preset angle through an optical view. Also, the method may further include: calculating the target area based on a pixel pitch of a visible pixel area and an angle at which the visible pixel area slants by the visible field divider.

Also, the method may further include: applying a weight, which is determined based on the pixel pitch of the visible pixel area and the angle at which the visible pixel area slants by the visual field divider, to a pixel value of the particular viewpoint and a pixel value of the adjacent viewpoint of the particular viewpoint to calculate a mixture pixel value.

The calculating of the mixture pixel value may include: summing a value acquired by multiplying a pixel value of the output pixel area by a weight based on an area ratio of first area of the visible pixel area corresponding to the output pixel area, and a value acquired by multiplying an adjacent pixel value by a weight based on an area ratio of a second area of the visible pixel area causing jagging, to calculate the mixture pixel value that is to be mapped in the output pixel area.

The method may further include: detecting at least one edge area of the input image and calculating the target area based on a difference between an output pixel area corresponding to the detected edge area and a visible pixel area corresponding to the edge area.

The calculating of the target area may include: determining a position of a pixel value that corresponds to the at least one edge area and is distributed on a plurality of views and calculating a target area included in the determined position according to depth information of the input image.

The method may further include: determining a position of a pixel value that corresponds to the at least one edge area and is distributed in an epipolar domain generated based on an epipolar image including the same pixel lines of a plurality of views and applying filtering according to depth information input into the determined position to calculate a mixture pixel value that is to be mapped in the target area.

The calculating of the mixture pixel value may include: performing weak filtering on an object having a low depth and performing strong filtering on an object having a high depth based on the depth information.

The adjacent viewpoint of the particular viewpoint used for calculating the mixture pixel value may include previous and subsequent viewpoints of the particular viewpoint.

The method may further include: calculating a mixture pixel value of one of R, G, and B sub pixels.

As described above, according to various exemplary embodiments, a pixel value that is to be mapped in an output pixel may be determined in consideration of a pixel pitch and a slanting angle of a visible pixel area provided to a viewer through an optical view in a viewing zone of the viewer, and a depth of an input image. Therefore, an aliasing or jagging phenomenon caused by an optical structure of a 3D display apparatus may be reduced, and thus a clear 3D image may be serviced to the viewer.

According to one or more exemplary embodiments, there may be provided a controller for a display. The controller may a memory. The memory may store a program. The program may instruct a processor to render a plurality of views having different viewpoints based on a depth of an input image, generate, based on pixel values forming the plurality of views, a multi-view image to be displayed on the display, generate a mixture pixel value based on a pixel value of a first viewpoint of a first view of the plurality of views and a pixel value of a second viewpoint of a second view of the plurality of views, and map the mixture pixel value to a target area of the multi-view image, the target area being calculated based on a difference between an output pixel area of the display and a corresponding visible pixel area provided through the optical view. The controller may further include the processor.

The method of displaying a multi-view image according to various exemplary embodiments described above may be implemented in a program to be provided to the display apparatus. The program including the method of displaying a multi-view image may be stored and provided in a non-transitory computer readable medium.

For example, there may be provided a non-transitory computer-readable medium that stores a program performing: rendering a plurality of views having different viewpoints based on a depth of an input image; generating a multi-view image to be displayed on a display panel, based on pixel values forming the plurality of views; and generating the multi-view image to be output, wherein a mixture pixel value is generated based on a pixel value of a particular viewpoint of the plurality of views and a pixel value of an adjacent viewpoint of the particular viewpoint and is mapped in a target area calculated based on a difference between an output pixel area of a display panel and a corresponding visible pixel area provided to a viewer through an optical view, to generate the multi-view image.

The non-transitory computer readable medium does not mean a medium storing data for a short period such as a register, a cache, a memory, or the like, but means a machine-readable medium semi-permanently storing the data. Various applications or programs described above may be stored and provided in the non-transitory computer readable medium such as a compact disc (CD), a digital versatile disk (DVD), a hard disk, a Blu-ray disk, a universal serial bus (USB) memory stick, a memory card, a read-only memory (ROM), or the like.

Hereinabove, although certain exemplary embodiments have been shown and described, it should be understood that the present disclosure is not limited to the disclosed exemplary embodiments and may be variously changed by those skilled in the art without departing from the spirit and the scope of the present disclosure. Therefore, the present disclosure should be construed as including all the changes, equivalents, and substitutions included in the spirit and scope of the present disclosure.

What is claimed is:

1. A multi-view image display apparatus comprising:
   a display comprising:
      a display panel; and
      a visual field divider disposed in front of the display panel; and
   a processor configured to:
      render a plurality of images of different viewpoints based on a depth of an input image, obtain, based on pixel values included in the plurality of images, a multi-view image, and control the display panel to display the multi-view image, wherein the processor obtains the multi-view image by mapping a mixture pixel value to a target area of the multi-view image, wherein the mixture pixel value is applied to a sub pixel in the target area and is obtained by mixing a sub pixel value associated with a first image among the plurality of images and a sub pixel value associated with a second image among the plurality of images based on a weight, wherein the target area is identified based on a preset angle between an output pixel area of the display panel and a corresponding visible pixel area provided in a viewing zone, and wherein the weight is determined based on a pixel pitch of the visible pixel area and the preset angle.

2. The multi-view image display apparatus of claim 1, wherein the visual field divider is configured to provide at least one pixel area at the preset angle in the viewing zone, and the processor is further configured to identify the target area based on the preset angle and the pixel pitch of the visible pixel area.

3. The multi-view image display apparatus of claim 2, wherein the processor is further configured to calculate the mixture pixel value by weighting a pixel value of the first image including red, green, and blue sub pixel values of the first image and a pixel value of the second image including red, green, and blue sub pixel values of the second image.

4. The multi-view image display apparatus of claim 3, wherein the processor is further configured to calculate the mixture pixel value by summing a first value acquired by multiplying the pixel value of the first image by a first weight based on an area ratio of a first area of the visible pixel area corresponding to the output pixel area and a second value acquired by multiplying the pixel value of the second image by a second weight based on an area ratio of a second area of the visible pixel area.

5. The multi-view image display apparatus of claim 1, wherein the processor is further configured to:

detect an edge area of the input image, and identify the target area based on a difference between an output pixel area corresponding to the detected edge area and a visible pixel area corresponding to the detected edge area.

6. The multi-view image display apparatus of claim 5, wherein the processor is further configured to:

determine a position of a pixel value, the pixel value corresponding to the detected edge area, and the detected edge area being distributed in the plurality of images, and identify the target area comprised in the determined position according to depth information of the input image.

7. The multi-view image display apparatus of claim 6, wherein the detected edge area is distributed in an epipolar domain generated based on an epipolar image comprising equal pixel lines of the plurality of images, and wherein the processor is further configured to filter the determined position according to the depth information to calculate the mixture pixel value.

8. The multi-view image display apparatus of claim 7, wherein the processor is further configured to:

perform weak filtering on a low-depth object in the input image having a low depth, the depth of the low-depth object being based on the depth information, and perform strong filtering on a high-depth object in the input image having a high depth, the depth of the high-depth object being based on the depth information.

9. The multi-view image display apparatus of claim 1, wherein the second image comprises at least one of a previous image and a subsequent image of the first image.

10. The multi-view image display apparatus of claim 1, wherein the second image is an adjacent image to the first image.

11. The multi-view image display apparatus of claim 2, wherein the visual field divider is disposed at the preset angle, and the pixel pitch of the visible pixel area corresponds to the preset angle at which the visual field divider is disposed.

12. The multi-view image display apparatus of claim 1, wherein the mixture pixel value is different from the sub pixel value associated with the first image, and wherein the mixture pixel value is different from the sub pixel value associated with the second image.

13. A method of controlling a multi-view image display apparatus comprising a display panel and a visual field divider disposed in front of the display panel, the method comprising:

rendering a plurality of images of different viewpoints based on a depth of an input image;

obtaining, based on pixel values included in the plurality of images, a multi-view image; and displaying the multi-view image on the display panel, wherein the obtaining the multi-view image comprises mapping a mixture pixel value to a target area in the multi-view image, wherein the mixture pixel value is applied to a sub pixel in the target area and is obtained by mixing a sub pixel value associated with a first image among the plurality of images and a sub pixel value associated with a second image among the plurality of images based on a weight, wherein the target area is identified based on a preset angle between an output pixel area of the display panel and a corresponding visible pixel area provided in a viewing zone, and wherein the weight is determined based on a pixel pitch of the visible pixel area and the preset angle.

14. The method of claim 13, wherein the visual field divider operates to provide at least one pixel area at the preset angle in the viewing zone, and the method further comprises identifying the target area based on the preset angle and the pixel pitch of the visible pixel area.

15. The method of claim 14, further comprising calculating the mixture pixel value by weighting a pixel value of the first image including red, green, and blue sub pixel values of the first image and a pixel value of the second image including red, green, and blue sub pixel values of the second image.

16. The method of claim 15, further comprising:

acquiring a first value by multiplying the pixel value of the first image by a first weight based on an area ratio of a first area of the visible pixel area corresponding to the output pixel area;

acquiring a second value by multiplying the pixel value of the second image by a second weight based on an area ratio of a second area of the visible pixel area; and calculating the mixture pixel value by summing the first value and the second value.

17. A controller for a display configured to provide a plurality of different viewpoints in a viewing zone, the controller comprising:
a memory, having stored therein a program that, when executed by a processor, instructs the processor to:
render a plurality of images of different viewpoints based on a depth of an input image, and
obtain, based on pixel values included in the plurality of images, a multi-view image,
wherein the obtaining the multi-view image comprises mapping a mixture pixel value to a target area in the multi-view image,
wherein the mixture pixel value is applied to a sub pixel in the target area and is obtained by mixing a sub pixel value associated with a first image among the plurality of images and a sub pixel value associated with a second image among the plurality of images based on a weight,
wherein the target area is identified based on a preset angle between an output pixel area of the display and a corresponding visible pixel area provided in a viewing zone, and
wherein the weight is determined based on a pixel pitch of the visible pixel area and the preset angle.

18. The controller according to claim 17, wherein the program, when executed by the processor, further instructs the processor to control the display to display the multi-view image.

19. A method of generating a multi-view image for a display configured to provide a plurality of different viewpoints in a viewing zone, the method comprising:
rendering a plurality of images of different viewpoints based on a depth of an input image; and
obtaining, based on pixel values included in the plurality of images, a multi-view image,
wherein the obtaining the multi-view image comprises mapping a mixture pixel value to a target area in the multi-view image,
wherein the mixture pixel value is applied to a sub pixel in the target area and is obtained by mixing a sub pixel value associated with a first image among the plurality of images and a sub pixel value associated with a second image among the plurality of images based on a weight,
wherein the target area is identified based on a preset angle between an output pixel area of the display and a corresponding visible pixel area provided in a viewing zone, and
wherein the weight is determined based on a pixel pitch of the visible pixel area and the preset angle.

20. The method according to claim 19, further comprising controlling the display to display the multi-view image.

* * * * *